United States Patent
Mutsers et al.

(10) Patent No.: US 6,506,855 B1
(45) Date of Patent: Jan. 14, 2003

(54) FLUIDIZED BED REACTOR WITH ASYMMETRIC GAS INLET

(75) Inventors: Stanislaus M. P. Mutsers, Geleen (NL); Paul J. Diepen, Den Bosch (NL)

(73) Assignee: DSM N.V., Heerlen (NL)

( * ) Notice: Subject to any disclaimer, the term of this patent is extended or adjusted under 35 U.S.C. 154(b) by 29 days.

(21) Appl. No.: 09/714,860

(22) Filed: Nov. 17, 2000

Related U.S. Application Data

(63) Continuation-in-part of application No. 09/572,927, filed on May 18, 2000, now Pat. No. 6,403,730.
(60) Provisional application No. 60/214,486, filed on Jun. 27, 2000.

(30) Foreign Application Priority Data

May 18, 1999 (NL) .............................. 1012082
May 15, 2000 (NL) .............................. 1015200

(51) Int. Cl.$^7$ ................................................. C08F 2/34
(52) U.S. Cl. ......................... 526/68; 526/348; 422/139
(58) Field of Search .......................... 422/139; 526/920, 526/901, 68, 348

(56) References Cited

U.S. PATENT DOCUMENTS 5,753,191 A  *  5/1998  Yamamoto et al. ......... 422/143

* cited by examiner

*Primary Examiner*—David W. Wu
*Assistant Examiner*—William Cheung
(74) *Attorney, Agent, or Firm*—Pillsbury Winthrop LLP

(57) ABSTRACT

Process for polymerizing one or more olefinic monomers in a fluid-bed reactor which is bounded at the bottom by a gas-distributing plate containing apertures, comprising the supply of a gas to the reactor through the gas-distributing plate and optionally the supply of a liquid to the reactor, in which the average rate at which the gas is supplied to the reactor is higher in a first part of the gas-distributing plate whose area equals half that of the gas-distributing plate than the average rate at which the gas is supplied in a second part covering the area of the gas-distributing plate that lies outside the first part and reactor suitable for this process.

13 Claims, 1 Drawing Sheet

FLUIDIZED BED REACTOR WITH ASYMMETRIC GAS INLET

Figure 1:
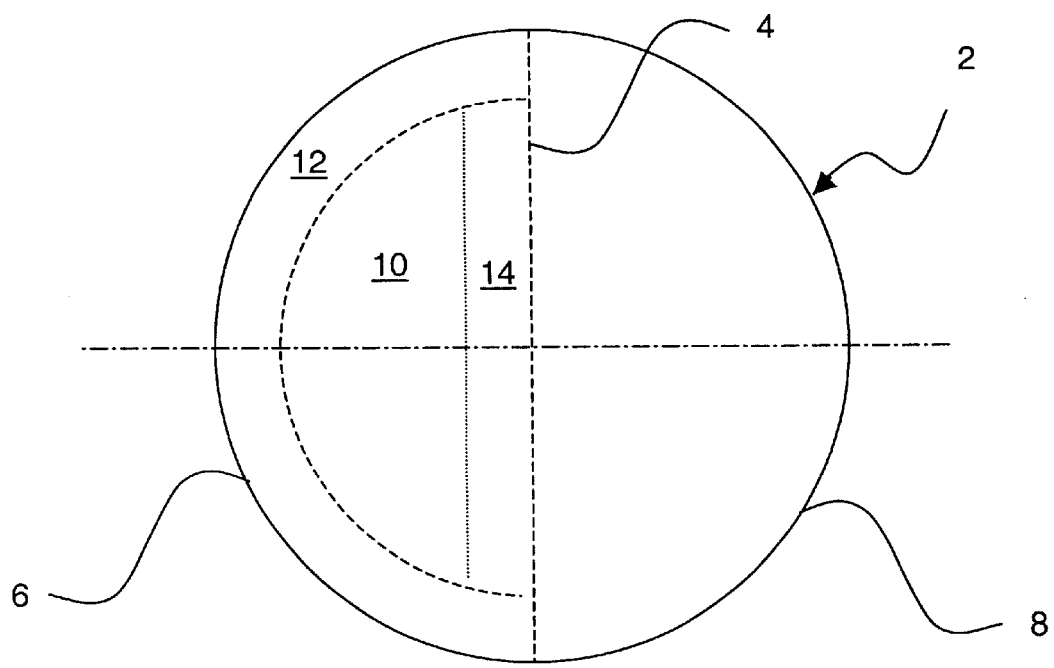

This application is a Continuation-in-Part of U.S. application Ser. No. 09/572,927, filed May 18, 2000 U.S. Pat. No. 6,403,730 June 11, 2002 which claims the benefit of NL Application 1012082, filed May 18, 1999, the complete disclosures of both the U.S. and the NL Applications are incorporated herein by reference in their entirety. This application further claims the benefit of U.S. Provisional Application Ser. No. 60/214,486, filed Jun. 27, 2000 and NL Application 1015200 filed May 15, 2000, the complete disclosures of both the U.S. and the NL Applications are incorporated herein by reference in their entirety.

The invention relates to a process for the gas-phase polymerisation of one or more olefinic monomers in a fluid-bed reactor which is bounded at the bottom by a gas-distributing plate containing apertures, comprising the supply of a gas to the reactor through the apertures.

The gas-phase polymerisation of olefines in a fluid bed is known per se, e.g. from WO-A-94/28032 and U.S. Pat. No. 4,543,399 and is effected in an elongated, generally vertically installed, reactor in which a bed of polymer particles is maintained in a fluidised state by means of a rising stream of gas which contains at least the gaseous monomers to be polymerised. The gas stream is supplied via a gas-distributing plate which separates the bottom part of the reactor from the reaction zone proper. This plate contains apertures which distribute the supplied gas stream across the area of the reaction zone as required, in the known reactors as homogeneously as possible. Structures for distributing the incoming gas stream or for preventing the risk of polymer dropping down from above may be present above the apertures. Such structures are known per se, as are suitable ways of distributing the apertures across the gas-distributing plate and the suitable sizes of the apertures. So as to nevertheless be able to realize a certain drop in pressure at a lower gas flow rate through the plate, the bottom part of the reactor may have a conical cross-section above the gas-distributing plate, or a peripheral part of the gas-distributing plate may have a closed design. To prevent the risk of accumulation of polymer particles on such a peripheral part, the sealing is preferably in the form of an oblique wall extending from the gas-distributing plate to the wall of the reactor. The angle between the oblique wall or the conical part of the wall and the plate must exceed the angle of repose of the polymer particles in the reactor, and is furthermore at least 30°, preferably at least 40°, and more preferably lies between 45° and 85°. If such an oblique wall is present, the 'gas-distributing plate' will hereinafter be understood to be the part of the floor of the reactor containing the apertures for the fluidising gas.

The rising gas stream may optionally also contain one or more inert gases and for example hydrogen as a chain length regulator. An important objective of the addition of inert gases is to control the gas mixture's dew-point. Suitable inert gases are for example inert hydrocarbons such as (iso)butane, (iso)pentane and (iso)hexane, but also nitrogen. They may be added to the gas stream either as a gas or in a condensed form as a liquid.

The gas stream is discharged via the top of the reactor and, after it has undergone certain treatments, new monomer is added to it to replace the monomer consumed in the polymerisation, after which it is returned to the reactor as (part of) the rising gas stream to maintain the bed. In addition, a catalyst is added to the bed. During the process, new polymer is constantly formed under the influence of the catalyst present, and at the same time some of the polymer formed is withdrawn from the bed, which ensures that the volume of the bed remains more or less constant. New monomer to replace the converted monomer is generally supplied in the form of a gas or liquid via the gas stream that maintains the bed.

The process applied in the known reactors shows the disadvantage that at a certain diameter of the fluid bed the height of the bed is restricted to at most 3 to 5 times that diameter. This seriously restricts the reactor capacity.

Object of the invention is to provide a process in which a fluid bed having a larger height/diameter ratio than in the known reactors can be stably maintained.

This aim is achieved because the average rate at which the gas is supplied to the reactor in a first part of the gas-distributing plate whose area equals half that of the gas-distributing plate exceeds the average rate at which the gas is supplied to a second part comprising the area of the gas-distributing plate outside the first part.

Surprisingly it was found that the height of the fluid bed may be greater thanks to the new distribution of the supplied gas across the gas-distributing plate. In the known process the ratio of the height and diameter of the fluid bed, is limited to at most a factor of 3 to 5. In the process according to the invention this ratio may be chosen to be up to no less than 50% higher than in the known process. When the same amount of polymer formed is withdrawn from the reactor, the residence time of catalyst then consequently increases by the same percentage, so that it is used more efficiently. The yield per unit of weight of the catalyst consequently increases, and the catalyst content of the polymer formed is consequently lower. This results in lower catalyst costs and a purer polymer.

Moreover this advantage allows applying slimmer reaction vessels, which implies major engineering advantages for polymerization reactors since these are pressure vessels.

A further advantage associated with the process according to the invention is the diminished entrainment of small polymer particles ('fines') in the gas stream leaving the reactor over its top.

Further it was found that it is possible in the process according to the invention to maintain in fluidised state larger particles, up to 2 and even 3 mm in diameter, than in the known process with its homogeneous gas distribution.

The polymerisation is an exothermal reaction. Heat must constantly be dissipated to maintain the temperature in the reactor at the required level. This is effected via the gas stream, whose temperature when it leaves the reactor is higher than that at which it was supplied to the reactor. The flow rate of the gas in the reactor cannot be chosen arbitrarily high, so it is not possible to dissipate any desired amount of heat. The minimum local flow rate of the gas is limited by the requirement that all parts of the bed must be kept in a fluid state. The risk of polymer powder being retained on the gas-distributing plate must be prevented. Therefore, the apertures are equally distributed across the entire area of the gas-distributing plate. On the other hand, the average flow rate of the gas must not be so great as to cause the polymer particles to be blown out of the top of the reactor. The aforementioned limits are to a great extent dictated by the dimensions and density of the polymer particles present in the bed and by the density and viscosity of the gas stream through the bed, and can be experimentally determined. 5 cm/sec is generally taken as the lower limit of the flow rate of the gas at any point in the fluid bed and 100 cm/sec as the upper limit of the average flow rate of the gas across the entire fluid bed. The latter value may be exceeded locally. In practice, average flow rates of between 20 and 80 cm/sec are often used. The flow or supply rate of the gas in a certain area of the gas-distributing plate is defined as the quotient of the amount of gas per second, expressed in $m^3/s$, that is supplied to that area, expressed in $m^2$. It is added that the rate at which the gas leaves the apertures may be substantially higher than the rate at which it is supplied as defined above. This is connected with the fact that the total effective area of the apertures will generally be less than 10% or even less than 5% of the area of the gas-distributing plate.

The aforementioned requirements limit the maximum flow rate of the gas at the given dimensions of the reactor, and hence the maximum amount of heat that can be dissipated. It also limits the maximum amount of reaction heat that may be produced, and hence also the maximum amount of polymer to be produced.

The detailed design and operation of fluid-bed reactors for polymerising olefinic monomers and the associated suitable process conditions are known per se and are for example described in detail in WO-A-94/28032 and in U.S. Pat. No. 4,543,399.

From this same U.S. Pat. No. 4,543,399 it is known to add new monomer to the gas stream discharged from the reactor and to cool the stream to such an extent as to cause it to partially condense. The two-phase stream obtained, which, owing to the latent heat of evaporation of the liquid part formed as a condensate, has a substantially greater heat-dissipating capacity, and hence cooling capacity, than a stream consisting exclusively of gas, is then supplied to the bottom side of the reactor. Such a method is referred to as 'condensed mode'. The dew-point of the two-phase stream must be lower than the temperature in the reaction zone so that the liquid can evaporate in it. This way the production capacity of a fluid-bed reactor proves to increase substantially in comparison with the known reactors with otherwise the same dimensions. According to the known method, the maximum amount of condensate-liquid in the two-phase stream is 20 wt. %. The examples go to 11.5 wt. %. Whenever hereinafter reference is made to 'gas', this is understood to include the aforementioned two-phase stream consisting of gas and liquid, which is in this discipline also known as 'vapour'.

In the known method the reactor capacity is also limited. This is due to the fact that the amount of liquid supplied cannot be increased as desired without the risk of lump formation and other undesired effects.

It has entirely unexpectedly been found that by solely distributing the gas supply across the area of the gas distributing plate in the manner characterised in the process according to the invention causes the effectiveness of the cooling effect of the supplied liquid to increase in comparison with the known process. This makes it possible for example to dose more catalyst to the bed at a certain amount of supplied liquid. A larger amount of polymer is then formed in the fluid bed while it nevertheless proves possible to neutralise the greater amount of heat of reaction produced. The advantage of the process according to the invention mentioned above can also be achieved in condensed mode processes, Another advantage of the process according to the invention lies in the fact that a larger quantity of liquid can be supplied to the fluid bed than in the known process, without the risk of the bed's stability being adversely affected. All the aforementioned advantages contribute towards increasing the production capacity of a fluid-bed installation operated in condensed mode.

The new process can be used in any reactor in which the gas supply in the gas-distributing plate has the required distribution. The simplest, and therefore preferred method of realization of the required gas supply distribution is to ensure that the total surface area of the apertures in the first part is larger than the surface area of the apertures in the second part. This can be realized for instance by choosing for the first part a larger number of apertures and/or bigger apertures than for the second part. This distribution of the number and the size of the apertures may be or have been realized during the construction of a new reactor, but it is also possible to modify the gas-distributing plate in an existing reactor so as to ensure that it has the required properties. The advantages of the process according to the invention can consequently also be obtained, at relatively low costs, by modifying or retrofitting an already existing reactor. The invention therefore also relates to the modification of an existing fluid-bed reactor by creating a distribution of apertures or retrofitting it with a gas distribution plate according to Present Invention such that the required distribution of the gas supply across the distributing plate described above is obtained.

The average rate at which the gas is supplied to the reactor in the first part of the gas-distributing plate exceeds the average rate at which the gas is supplied to the second part of the gas-distributing plate. Fluid-bed reactors are generally cylindrical. The two principal embodiments whereby the first and the second part of the gas-distributing plate are chosen are the one in which the first part is a central part and the second part is a peripheral part and the one in which the first part and the second part are situated at either side of a straight line through the centre or the centre of gravity of the gas-distributing plate. In the former case a 'central part' is understood to be a part which comprises the centre and whose area equals half that of the gas-distributing plate. If the gas-distributing plate has a different shape, the central part comprises its centre of gravity. The peripheral part is the part lying between the circumference of the central part and the circumference of the gas-distributing plate. The area of this peripheral part also equals half that of the gas-distributing plate. The central part will preferably, and generally, be a circle whose centre is the centre of the reactor. The central part may for example also have a different shape, but it preferably has a high degree of symmetry and is then for example a regular polygon whose centre of gravity coincides with the reactor's centre or centre of gravity. The gas is thus supplied in a symmetric pattern, which is beneficial for the reactor's stability.

If the reactor has the shape of a cylinder, then the line mentioned in the second embodiment is a diameter of the gas-distributing plate. If the reactor section is of another shape, said line is a straight line through the centre of gravity. Said lines running through the centre or the centre of gravity are in the following jointly referred to as 'central line'.

It has already been noted above that the limiting values of the range within which the average supply rate of the gas can be chosen to a great extent depend on the dimensions and density of the polymer particles present in the bed and on the density and viscosity of the gas stream flowing through the bed. They can be experimentally determined and have already been mentioned above. Said limiting values must be respected in each of the parts of the gas-distributing plate distinguished in the process according to the invention.

In the process according to the invention the average supply rate of the gas is defined as the quotient of the amount of gas per second, expressed in $m^3/s$, that flows through a certain area of the gas-distributing plate, expressed in m2. The ratio of the average rate at which the gas is supplied to the first part and that at which it is supplied to the second part may lie between 40:1 and 1.1:1. The most stable operation is obtained at ratios between 10:1 and 1.1:1. Preferably this ratio lies between 4:1 and 1.2:1. This ratio is preferably controlled via measures affecting the amount of gas supplied to each part of the gas-distributing plate, for example by making the total area of the apertures in the first part larger than in the second part. This can be achieved for example by creating a larger number of apertures and/or larger apertures in the first part. Or the apertures may have different shapes in the different parts. The total area of the apertures in the first part is preferably at least 55% and at most 90% of the total area of the apertures in the gas-distributing plate. More preferably it is at most 80%.

The rate at which the gas is supplied does not have to be the same across the entire area of the aforementioned parts of the gas-distributing plate. It is essential, however, that the ratio of the supply rates at which the gas is supplied to each of the two parts defined above is always satisfied. The rate at which the gas is supplied to a part of the gas-distributing plate lying closer to the centre of the reactor or to either side of the dividing line does however not have to exceed at any point that in an adjacent part lying closer to the reactor wall or, respectively, at either side of the dividing line. In a suitable embodiment with a central and a peripheral part the rate at which the gas is supplied decreases from the centre of the gas-distributing plate to the wall, steadily or in one or more steps. In a suitable embodiment with a central line the gas supply is larger in the middle of the first part than in the part closest to the wall. This part which is closest to the wall extends from the wall, with a width which is preferably equal to at least 0.2, more preferably at least 0.25× the radius of the reactor, and at most equal to 0.75, more preferably 0.5× that radius. From WO-A-94/28032 it is also known to separate the liquid from the two-phase stream obtained from the gas stream to be recycled after cooling in a condensed-mode process, and to supply this liquid to the reactor separated from the gas stream. The various embodiments and installations for supplying the liquid to the reactor described therein can be used in the reactor according to the invention. The same holds for the dimensions, flow rates and ratios that can be learned there from. The liquid is injected into the fluid bed or vaporised in it, optionally with the aid of a propellant, via a supply passage which, coming from the area beneath the gas-distributing plate, ends above the gas-distributing plate, in the method according to the invention preferably in the first part of said plate. In this way it is possible to supply a larger amount of liquid relative to the amount of gas that is supplied. This makes it possible to dissipate an even greater amount of heat, as a result of which a greater amount of polymer, and a corresponding greater amount of heat, may be produced. WO-A-94/28032 specifies 1.21 as the maximum allowable ratio of the mass of the supplied liquid and the mass of the total amount of gas supplied, as determined in a simulation experiment.

The advantages of the invention are also obtained when the characteristics of the process according to the invention are used in combination with the technique known from WO-A-94/28032.

It has been found to be advantageous to use the process according to the invention in a reactor whose reaction zone has been divided into two compartments by a substantially vertical partition extending from a point lying above the gas-distributing plate to a point lying below the end surface, i.e. below the top of the fluidised bed.

An advantage of the presence of a partition in combination with the chosen distribution of the supplied gas across the area of the gas-distributing plate in the reactor according to the invention is now the possibility of maintaining a stable fluid bed with a height to diameter ratio which is up to a factor of 1.5, 3 or even 4 larger than in the case of the known reactors. This is advantageous because the reaction volume can then be enlarged while the diameter remains the same, which implies major structural advantages in the case of pressure vessels, which is what the reactors are. Also if there is no partition wall, but the gas supply, as described in the foregoing, is not evenly distributed over the gas-distributing plate it appears to be possible to choose the height to diameter ratio of the fluid bed higher by a factor of 1.3 or even up to 1.5.

In case the gas-distributing plate is divided into a central and a peripheral part, a particularly suitable partition is a vertically placed tube or sleeve, preferably concentric relative to the reactor. The ratio of the area of the cross-section of the tube or sleeve and that of the central part of the gas-distributing plate is preferably between 1.8:1 and 1:5. As such a tube or sleeve will be totally submerged in the fluid bed, there will be no noticeable differences in pressure across the wall of the tube and the latter may have a light structure. The tube or sleeve can be easily suspended from a higher part of the reactor, supported by a bottom part or attached to the wall of the reactor. In this context a sleeve differs from a tube in the shape of its cross-section, which is of a rounded shape in the case of a tube, for example circular or ellipsoid, and more angular in the case of a sleeve, for example triangular, quadrangular, octagonal or polygonal, whether or not regular. The walls of the sleeve or tube may be parallel to the reactor axis, but in certain cases it proved advantageous for it to have a slightly conical shape. The apex formed by the wall of the tube or sleeve is at most 5° and preferably at most 2.5°. Very suitable are apexes between 0° and 2°. The ratio of the area of the radial cross-section of the tube or sleeve and that of the reactor lies between 1:9 and 9:10 and, in order to achieve the greatest possible stability, preferably between 1:4 and 3:4. In the case of a conical tube or sleeve this holds for its average cross-section. The bottom of the tube or sleeve is at least 0.05×, preferably at least 0.1× the diameter of the reaction zone above the gas-distributing plate and preferably at most 3× that diameter. The favourable effect of the presence of a vertical partition was found to decrease in the case of deviating dimensions. The top is at least 0.05×, preferably at least 0.1× the diameter of the reaction zone beneath the end of that reaction zone and preferably at most 2× that diameter. It has been found that the bed may project further beyond the partition at the top than at the bottom. The greater the height of the reaction zone, the lower the top of the partition may lie.

An advantage of the presence of such a partition lies in the fact that a given reactor can be operated in a stable manner even when the mass ratio of (liquid supplied to the reactor):(amount of gas supplied to the reactor) is above 2:1 or even above 4:1. Said ratio is in any case at least 10% and even more than 50% to even more than 100 % higher than when the process is carried out in the corresponding reactor without a partition, without any risk of lump formation or other undesired side-effects. In combination with the more favourable ratio of the supplied amount of liquid and the reactor capacity which can be achieved in the process according to the invention as a result of the new distribution of the supplied gas across the gas-distributing plate, a greatly improved yield can be achieved.

In case the gas-distributing plate is divided into two parts by a central line it is very suitable if a vertical partition wall, present in the reaction zone, has a substantially axially oriented flat, curved or cranked shape. Such a partition wall may link up at either side with the inner wall of the reactor, but an intermediate space of up to 10 cm between the side of the partition wall and the inner wall is also admissible. In this way the reaction zone is divided into two compartments, which can differ in size. In a first embodiment the projection of the partition wall on the gas-distributing plate coincides with the central line. This projection may also lie within the first part of the gas-distributing plate; in that case the surface area between the central line and the projection of the partition wall is equal to at most 50%, preferably at most 20% of the surface area of the first part. If said projection lies entirely or partly in the second part of the gas-distributing plate, the surface area in the second part located between that projection and the central line is preferably equal to at most 25% of the surface area of the second part. If these limitations are respected, stable operation of the reaction is ensured.

The substantially axially oriented wall should stand in a virtually vertical position. By this is understood: parallel to the axis of the reactor, but at the same time not more than 5°, preferably not more than 2,5° off plumb relative to that axis.

The aforementioned requirements and preferences relating to the positioning of a tube- or sleeve-shaped partition wall in the fluid bed apply equally to a partition wall in the form of a plate.

A suitable embodiment of a gas-distributing plate which is divided into a first and a second pan by a central line is represented in the following drawings of which:

BRIEF DESCRIPTION OF DRAWING FIGURES

Figure 2:
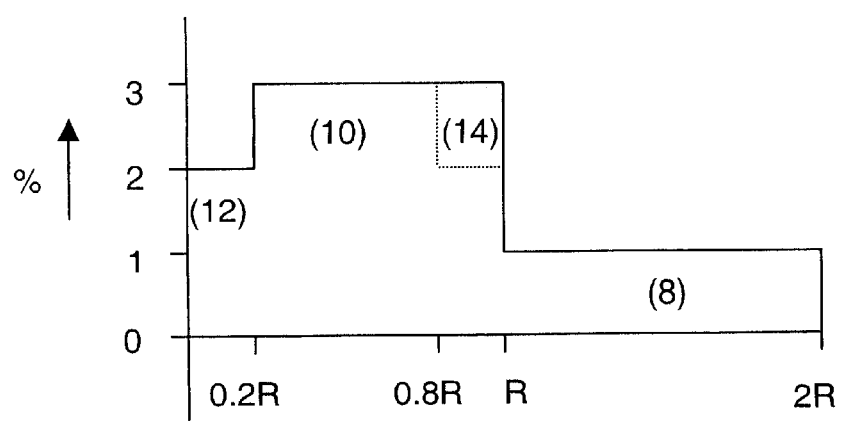

FIG. 1 is a top view of a circular gas-distributing plate and FIG. 2 is a cross section along the line A–A' in FIG. 1.

In FIG. 1, 2 is a circular gas-distributing plate, divided by a central line 4 into a first half 6 and a second half 8. In the second half 8 the apertures (not shown) take up 1% on average of the surface area. The first half 6 is subdivided into a central section 10, bounded by dashed lines, in which the apertures take up 3% on average of the surface area, and a semi-annular peripheral part 12, in which the apertures take up 2% on average of the surface area. The width of the peripheral part 12 is equal to 0.2× the radius R of the gas-distributing plate. It is also possible to choose for the portion 14 of central section 10 that is adjacent to central line 4, bounded by the dotted line, for instance over a width of up to 0.2–0.5 times the radius of the gas-distributing plate, a lower percentage of apertures than in the rest of central section 10, in this case for instance also 2% as in peripheral part 12.

In FIG. 2 the average percentage share of the apertures along the central line A–A', corresponding to the embodiment described for FIG. 1, is represented graphically. The numbers of the corresponding areas of FIG. 1 have been denoted between brackets.

The process according to the present invention is suitable for the preparation of polyolefines in the gas phase by polymerising one or more olefinic monomers, at least one of which is preferably ethylene or propylene. Olefines preferably used in the process according to the invention are those containing 2 to 8 C atoms. Minor amounts of olefines containing more than 8 C atoms, for example containing 9 to 18 C atoms, may however also optionally be used.

It is hence possible to prepare homopolymers of ethylene or propylene, copolymers of ethylene and propylene and copolymers of ethylene and/or propylene containing one or more $C_2$–$C_8$ alpha-olefines in a preferred embodiment.

Preferred alpha-olefines are ethylene, propylene, butene-1, pentene-1, hexene-1, 4-methylpentene-1 and octene-1. An example of a higher olefine that can be copolymerised with the primary ethylene or propylene monomer or that may partially replace the $C_2$–$C_8$ monomer is decene-1. Dienes may also be used, for example 1,4-butadiene, 1,6-hexadiene, dicyclopentadiene, ethylidene-norbornene and vinyl norbornene.

Besides ethylene or propylene homopolymers, it is also possible to produce copolymers of these two monomers with the process according to the invention and also comonomers of these monomers together or separately with one or more higher olefines and/or dienes. Ziegler-Natta catalysts and other multiple-site catalysts can be used as catalyst in these processes, but so can single-site or multiple-site catalysts, for example metallocene catalysts. The processes for the production of said polymers in a fluid-bed reactor that are known per se can be used in the reactor according to the invention, with the aforementioned advantages of the invention being achieved. The invention also relates to a gas-distributing plate with apertures for a fluid-bed reactor for polymerising olefines, a non overlapping first and second part can be distinguished, each part having an area of one half of the area of the gas distributing plate, the total area of the apertures in the first part being at least 55% and at most 91% of the total area of the apertures in the gas-distributing plate.

As described above, such a gas-distributing plate has the unexpected effect of its presence in a certain fluid-bed reactor making it possible to obtain a higher polymer yield following the supply of a certain amount of liquid to the reactor than in the case of the apertures being equally distributed in terms of surface area across the gas-distributing plate. The presence of the gas-distributing plate according to the invention also makes it possible to supply a greater amount of liquid to the reactor and/or to use a reactor with a greater height/diameter ratio and operate it in a stable manner.

The other characteristics and embodiments of the gas-distributing plate are as described above.

The invention further relates to a fluid bed reactor, comprising a reactor chamber, which is bounded at the bottom by a gas-distributing plate containing apertures, wherein the total area of the apertures in a first part of the gas-distributing plate whose area equals half that of the gas-distributing plate is at least 55% and at most 90% of the total area of the apertures in the gas-distributing plate. Further characteristics and embodiments of the gas-distributing plate are as described hereinbefore. The invention will now be elucidated with reference to the following examples without being limited thereto.

EXAMPLE I

In a cylindrical reactor with a diameter of 0.85 m and a height(=distance from the gas-distributing plate to the gas outlet) of 8.5 meters a fluid bed with a height of 4.2 m from de gas-distributing plate is maintained. The gas-distributing plate has round apertures with a diameter of 5 mm. The percentage of these apertures relative to the total area of the gas-distributing plate decreases in steps from the centre of the gas-distributing plate to the wall of the reactor. In a first segment having the shape of a circle whose centre lies along the reactor's axis and whose area equals ⅓ of the area of the gas-distributing plate the relative proportion of the apertures is 2.25%, in a second segment lying outside this and having the shape of a ring adjoining the circle with the same area this proportion is 1.5% and in a third segment having the shape of a ring adjoining the second segment this proportion is 0.75%. So the three segments cover the entire area of the gas-distributing plate and they have equal surface areas. The apertures are in each case equally distributed across the segments, the number of apertures per segment decreasing from the centre to the edge.

Converted on the basis of a central and a peripheral part, each covering 50% of the area of the gas-distributing plate, the ratio of the areas of the apertures in the two parts is 2:1.

A mixture of propylene (2.16 MPa), hydrogen (0.04 MPa) and nitrogen (0.3 MPa) is supplied to the reactor via the gas-distributing plate. The reactor temperature is kept at 70° C. The reactor pressure is 2.5 MPa. The flow rates of the gas in the three aforementioned segments of the gas-distributing plate are 0.4, 0.6 and 0.8 m/s, respectively. The average gas flow rate across the entire gas-distributing plate is 0.6 m/s.

A Ziegler-Natta catalyst, suitable for polymerising propylene, is introduced into the fluid bed via the reactor wall.

The non-reacted gases are discharged via the gas outlet in the top of the reactor and are cooled to a temperature at which predominantly propylene condensed. The cooled gas-liquid mixture is returned via the bottom, replenished to compensate for the gases consumed in the reaction to the aforementioned partial pressures. The composition of the gas is checked with the aid of gas chromatography. A larger amount of condensate is formed at lower cooling temperatures. The reactor temperature is maintained at the required level by adding more catalyst when the supply of condensate increases, so that more heat of reaction is also released. It is possible to cool the off-gas to 44° C., with 34% condensate being present in the mixture supplied to the reactor, before the reactor becomes unstable as a result of the formation of hot and cold spots.

The maximum production rate achievable is 4.32 tons/m$^2$.h.

COMPARATIVE EXPERIMENT A

Example I is repeated with the understanding that the relative proportion of the apertures in the gas-distributing plate is the same across the entire area and amounts to 1.5%.

It now proves possible to cool the off-gases only to 48° C., with 22% condensate being present in the mixture supplied to the reactor, before the reactor becomes unstable as a result of the formation of hot and cold spots.

The maximum production rate achievable is 2.64 tons/m$^2$.h.

EXAMPLE II AND COMPARATIVE EXPERIMENT B

Example I and Comparative Experiment A are repeated, on the understanding that the reactor pressure is now kept at 2.3 Mpa by reducing each of the partial gas pressures specified in Example I by a factor of 0.92.

The minimum allowable cooling temperatures ($T_{min}$), the total reactor pressure ($P_{total}$), the condensate percentages, the heat dissipation capacity/m$^2$ of base area that can be achieved with them and the output/m$^2$ of reactor base area per hour are given in Table 1.

EXAMPLES III AND IV

Examples III and IV correspond to Examples I and II, respectively, with the difference that ⅓ and ¾ of the $N_2$, respectively is replaced by iso-butane (Example III) and iso-pentane (Example IV), respectively.

The results corresponding to those mentioned in Example II are also shown in Table 1.

TABLE 1

| Example/<br>Comp. Exp. | $T_{min}$<br>° C. | $P_{total}$<br>Mpa | Condensate<br>% | Dissipation of<br>heat MW/m$^2$ | Output<br>tons/m$^2 \cdot$ h |
|---|---|---|---|---|---|
| I | 44 | 2.5 | 34 | 2.84 | 4.32 |
| A | 48 | 2.5 | 22 | 1.74 | 2.64 |
| II | 42 | 2.3 | 36 | 2.83 | 4.30 |
| B | 44 | 2.3 | 21 | 1.61 | 2.45 |
| III | 48 | 2.5 | 32 | 2.81 | 4.27 |
| IV | 44 | 2.3 | 38 | 3.44 | 5.22 |

Comparison of examples I and II with comparative experiments A and B, respectively, shows that the modification of the distribution of the gas supply across the gas-distributing plate causes the maximum allowable amount of condensate, and hence the production that can be achieved in the reactor, to increase substantially.

What is claimed is:

1. Process for polymerizing one or more olefinic monomers in a fluid-bed reactor which is bounded at the bottom by a gas-distributing plate containing apertures, comprising supplying a gas to the reactor through the gas-distributing plate, wherein an average rate at which the gas is supplied to the reactor is higher in a first part of the gas-distributing plate, which comprises the center of gravity of the gas-distributing plate, and whose area equals half that of the gas-distributing plate, than the average rate at which the gas is supplied in a second part, which is a peripheral part covering the area of the gas-distributing plate that lies outside the first part.

2. Process for polymerizing one or more olefinic monomers in a fluid-bed reactor which is bounded at the bottom by a gas-distributing plate containing apertures, comprising supplying a gas to the reactor through the gas-distributing plate, wherein an average rate at which the gas is supplied to the reactor is higher in a first part of the gas-distributing plate, whose area equals half that of the gas-distributing plate, than the average rate at which the gas is supplied in a second part, covering the area of the gas-distributing plate that lies outside the first part, and in which the first and the second part are situated at either side of a central line through the center of gravity of the gas-distributing plate.

3. Process for polymerizing one or more olefinic monomers in a fluid-bed reactor which is bounded at the bottom by a gas distributing plate containing apertures, comprising supplying a gas to the reactor through the gas distributing plate, wherein an average rate at which the gas is supplied to the reactor is higher in a first part of the gas distributing plate whose area equals half that of the gas distributing plate than the average rate at which the gas is supplied in a second part covering the area of the gas distributing plate that lies outside the first part, and supplying a liquid to the reactor.

4. Process according to claim 1, or claim 2, in which the process further comprises supplying a liquid into the reactor.

5. Process according to claim 4, in which the ratio of the average rates at which the gas is supplied in the first part and in the second part is between 10:1 and 1.1:1.

6. Process according to claim 4, in which part, at least, of the gas supplied is discharged from the reactor and is cooled to such an extent that part, at least, of the gas condenses, after which part, at least, of the cooled gas and of resulting liquid is returned to the reactor.

7. Process according to claim 6, in which the condensate obtained is supplied to the reactor via the apertures in the gas-distributing plate.

8. Process according to claim 6, in which the condensate obtained is separated from the cooled gas and is separately returned to the reactor.

9. Process according to claim 2, in which the central line is a straight line.

10. Process according to any one of claims 1, 2, 3, 6, 7, 8 or 9, in which the ratio of the average rates at which the gas is supplied in the first part and in the second part is between 10:1 and 1.1:1.

11. Process according to claim 10, in which the ratio of the average rates at which the gas is supplied in the first part and in the second part is between 4:1 and 1.2:1.

12. Process according to claim 1, wherein a vertical tube or sleeve which comprises the axis of the reactor is present in the reactor.

13. Process according to claim 2, wherein a vertical partition wall is present in the reactor.

* * * * *